US012656947B2

(12) United States Patent
Peterson et al.

(10) Patent No.: US 12,656,947 B2
(45) Date of Patent: Jun. 16, 2026

(54) PERFORMING SELECT INPUT/OUTPUT REQUESTS WHILE IN PROTECTED MEMORY STATES

(71) Applicant: International Business Machines Corporation, Armonk, NY (US)

(72) Inventors: Beth Ann Peterson, Tucson, AZ (US); Lokesh Mohan Gupta, Tucson, AZ (US); Matthew G. Borlick, Tucson, AZ (US); Clint A. Hardy, Tucson, AZ (US); Trang Thuy Le, San Jose, CA (US); Trinh Nguyen, San Jose, CA (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 18/514,888

(22) Filed: Nov. 20, 2023

(65) Prior Publication Data

US 2025/0165140 A1 May 22, 2025

(51) Int. Cl.
*G06F 3/06* (2006.01)
(52) U.S. Cl.
CPC .......... *G06F 3/0604* (2013.01); *G06F 3/0634* (2013.01); *G06F 3/0659* (2013.01); *G06F 3/0679* (2013.01)
(58) Field of Classification Search
CPC .... G06F 3/0604; G06F 3/0634; G06F 3/0659; G06F 3/0679; G06F 3/0605; G06F 3/061; G06F 3/0614; G06F 3/0617; G06F 3/067
See application file for complete search history.

(56) References Cited

U.S. PATENT DOCUMENTS 5,701,417 A * 12/1997 Lewis ................... G06F 15/177
709/245
8,959,305 B1 2/2015 Lecrone et al.
9,436,595 B1 * 9/2016 Benitez .............. G06F 12/0246
(Continued)

FOREIGN PATENT DOCUMENTS

TW 202301133 A 1/2023
TW 202531003 A 8/2025
(Continued)

OTHER PUBLICATIONS

Geeks for Geeks, Memory Organisation in Computer Architecture, Feb. 13, 2020, https://www.geeksforgeeks.org/memory-organisation-in-computer-architecture/?ref=ml_lbp (Year: 2020).*
(Continued)

*Primary Examiner* — Rocio Del Mar Perez-Velez
*Assistant Examiner* — Kaitlyn H Pham
(74) *Attorney, Agent, or Firm* — Kristofer Haggerty

(57) ABSTRACT

A computer-implemented method, according to one approach, includes: receiving an indication that memory has entered a protected state. An I/O request that is intended for a target location in the memory is also received. Moreover, the relative significance of the I/O request is evaluated, and in response to concluding the I/O request is sufficiently significant, the I/O request is performed at the target location. However, in response to concluding the I/O request is insufficiently significant, the I/O request is denied.

22 Claims, 9 Drawing Sheets

(56) References Cited

U.S. PATENT DOCUMENTS

| | | | |
|---|---|---|---|
| 10,705,764 B2 | 7/2020 | Wilcock | |
| 11,163,477 B2 | 11/2021 | LeCrone et al. | |
| 11,194,502 B1 * | 12/2021 | Lin | G06F 3/0658 |
| 11,461,018 B2 | 10/2022 | Quinn et al. | |
| 2004/0049645 A1 | 3/2004 | Lee et al. | |
| 2007/0055837 A1 * | 3/2007 | Rajagopal | G06F 12/1475 |
| | | | 711/163 |
| 2008/0034174 A1 * | 2/2008 | Traister | G06F 12/0246 |
| | | | 711/159 |
| 2008/0126675 A1 | 5/2008 | Fu | |
| 2008/0170436 A1 | 7/2008 | Chun et al. | |
| 2009/0271763 A1 | 10/2009 | Varma et al. | |
| 2011/0087870 A1 * | 4/2011 | Spangler | G06F 11/1415 |
| | | | 713/1 |
| 2011/0258410 A1 | 10/2011 | Lambert et al. | |
| 2013/0080726 A1 | 3/2013 | Kegel et al. | |
| 2013/0247231 A1 * | 9/2013 | Sibert | H04L 63/126 |
| | | | 726/34 |
| 2016/0231945 A1 * | 8/2016 | Choudhuri | G06F 3/0689 |
| 2016/0320985 A1 | 11/2016 | Thomas | |
| 2017/0052719 A1 * | 2/2017 | Boitei | G06F 3/0688 |
| 2017/0060783 A1 | 3/2017 | Chiu et al. | |
| 2017/0102884 A1 * | 4/2017 | Kim | G06F 3/0659 |
| 2017/0123972 A1 * | 5/2017 | Gopinath | G06F 3/0616 |
| 2018/0024763 A1 * | 1/2018 | Kodera | G11C 7/24 |
| | | | 711/163 |
| 2019/0056999 A1 * | 2/2019 | Foxworth | G11C 7/20 |
| 2021/0103390 A1 * | 4/2021 | Yano | G11C 29/88 |
| 2021/0200720 A1 * | 7/2021 | Ramabhadran | H04L 67/1095 |
| 2021/0326217 A1 | 10/2021 | Martin et al. | |
| 2022/0398029 A1 | 12/2022 | A Shaheed et al. | |
| 2022/0414004 A1 | 12/2022 | Brewer et al. | |
| 2023/0169156 A1 * | 6/2023 | Mozano | G06F 21/6218 |
| | | | 726/4 |
| 2024/0069729 A1 * | 2/2024 | Sangle | G06F 3/0683 |
| 2024/0419326 A1 * | 12/2024 | Choudhary | G06F 3/064 |
| 2025/0165145 A1 | 5/2025 | Peterson et al. | |

FOREIGN PATENT DOCUMENTS

| | | | |
|---|---|---|---|
| WO | 2025/108697 A1 | 5/2025 | |
| WO | 2025/108698 A1 | 5/2025 | |

OTHER PUBLICATIONS

Microsoft Computer Dictionary (5th Edition) (Year: 2002).*

International Searching Authority, "Notification of Transmittal of the International Search Report and the Written Opinion of the International Searching Authority, or Declaration," Patent Cooperation Treaty, Feb. 13, 2025, 11 pages, International Application No.—PCT/ EP2024/081203.

International Searching Authority, "Notification of Transmittal of the International Search Report and the Written Opinion of the International Searching Authority, or Declaration," Patent Cooperation Treaty, Feb. 13, 2025, 11 pages, International Application No.—PCT/ EP2024/081204.

United States Non-Final Rejection dated Mar. 14, 2025, 40 pages in U.S. Appl. No. 18/514,965.

Dehn, B., "Reclaiming Storage in a SAN Environment: the Good, the Bad, and the Ugly," EMC Proven Professional Sharing, 2009, 35 pages.

Vmware, "vSphere Storage," Vmware, Inc., Update 3,2023, 421 pages.

Anonymous, "Method for Prioritizing Host I/O Over Flash Memory Garbage Collection Using Resource Awareness," IP.com Prior Art Database, Technical Disclosure No. IPCOM000271225D, Nov. 16, 2022, 3 pages.

Anonymous, "Method for Tape to Cloud reclamation and defragmentation," IP.com Prior Art Database, Technical Disclosure No. IPCOM000239024D, Oct. 1, 2014, 3 pages.

Anonymous, "Method and System for Coordinating Reclamation of Space in Hard Disks/Partitions in a Stream Processing Graph," IP.com Prior Art Database, Technical Disclosure No. IPCOM000198698D, Aug. 12, 2010, 2 pages.

Biswal, D., "Adaptive Thin Reclamation on Storage Volumes," IP.com Prior Art Database, Technical Disclosure No. IPCOM000207293D, May 24, 2011, 4 pages.

Peterson B., U.S. Appl. No. 18/514,965, filed Nov. 20, 2023.

IBM, List of IBM Patents Or Patent Applications Treated As Related, dated Nov. 21, 2023, 2 pages.

* cited by examiner

100

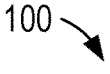

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED MEMORY RECLAMATION CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

YES

622

PERFORMING SELECT INPUT/OUTPUT REQUESTS WHILE IN PROTECTED MEMORY STATES

BACKGROUND

The present invention relates to data storage, and more specifically, this invention relates to performing select input/output (I/O) requests in memory despite the memory being placed in a protected state.

Using Flash based memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, situations arise where logical storage capacity is disconnected from the corresponding amount of available physical storage. For instance, data can be compressed at different rates, making it difficult to estimate the amount of physical storage space that will be consumed by a given amount of data once it has been compressed. In situations where data compresses less than anticipated, a greater amount of physical storage space will be consumed than predicted, leading to situations where physical storage is fully consumed despite logical storage space still being available. Similar outcomes are experienced in conventional space efficient designs where the logical storage capacity is greater than the physical storage capacity from the outset. For instance, situations in which data is less sparse than anticipated lead to situations where physical storage capacity is completely filled.

As a result, conventional implementations that include such Flash-based SSDs have not been able to maintain a sufficient amount of useable (e.g., free) space therein to satisfy incoming operations. For instance, as memory in conventional products runs out of useable physical space to store data, users are prevented from entering additional operations. While this user lockout is applied in conventional products to avoid memory overflow situations, in practice it has resulted in memory becoming stuck. It follows that a solution to this persistent degradation of memory management and access in conventional implementations is desired.

SUMMARY

A computer-implemented method, according to one approach, includes: receiving an indication that memory has entered a protected state. An I/O request that is intended for a target location in the memory is also received. Moreover, the relative significance of the I/O request is evaluated, and in response to concluding the I/O request is sufficiently significant, the I/O request is performed at the target location. However, in response to concluding the I/O request is insufficiently significant, the I/O request is denied.

A computer program product, according to another approach, includes a computer readable storage medium having program instructions embodied therewith. Moreover, the program instructions are readable by a processor, executable by the processor, or readable and executable by the processor, to cause the processor to: perform the foregoing method.

A system, according to another approach, includes: memory, and a processor. The system also includes logic that is integrated with the processor, executable by the processor, or integrated with and executable by the processor. Moreover, the logic is configured to: perform the foregoing method.

A computer-implemented method, according to still another approach, includes: receiving an indication that memory in a system has entered a protected state in response to an error being experienced by the system. In response to receiving the indication, an I/O request is prepared. The I/O request that is prepared is intended for a target location in the memory to circumvent the protected state. Moreover, the I/O request is configured to cause the memory to create more available space. Furthermore, the I/O request is sent to the target location in the memory.

A computer program product, according to still another approach, includes a computer readable storage medium having program instructions embodied therewith. The program instructions are readable by a processor, executable by the processor, or readable and executable by the processor, to cause the processor to: perform the method above.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2:
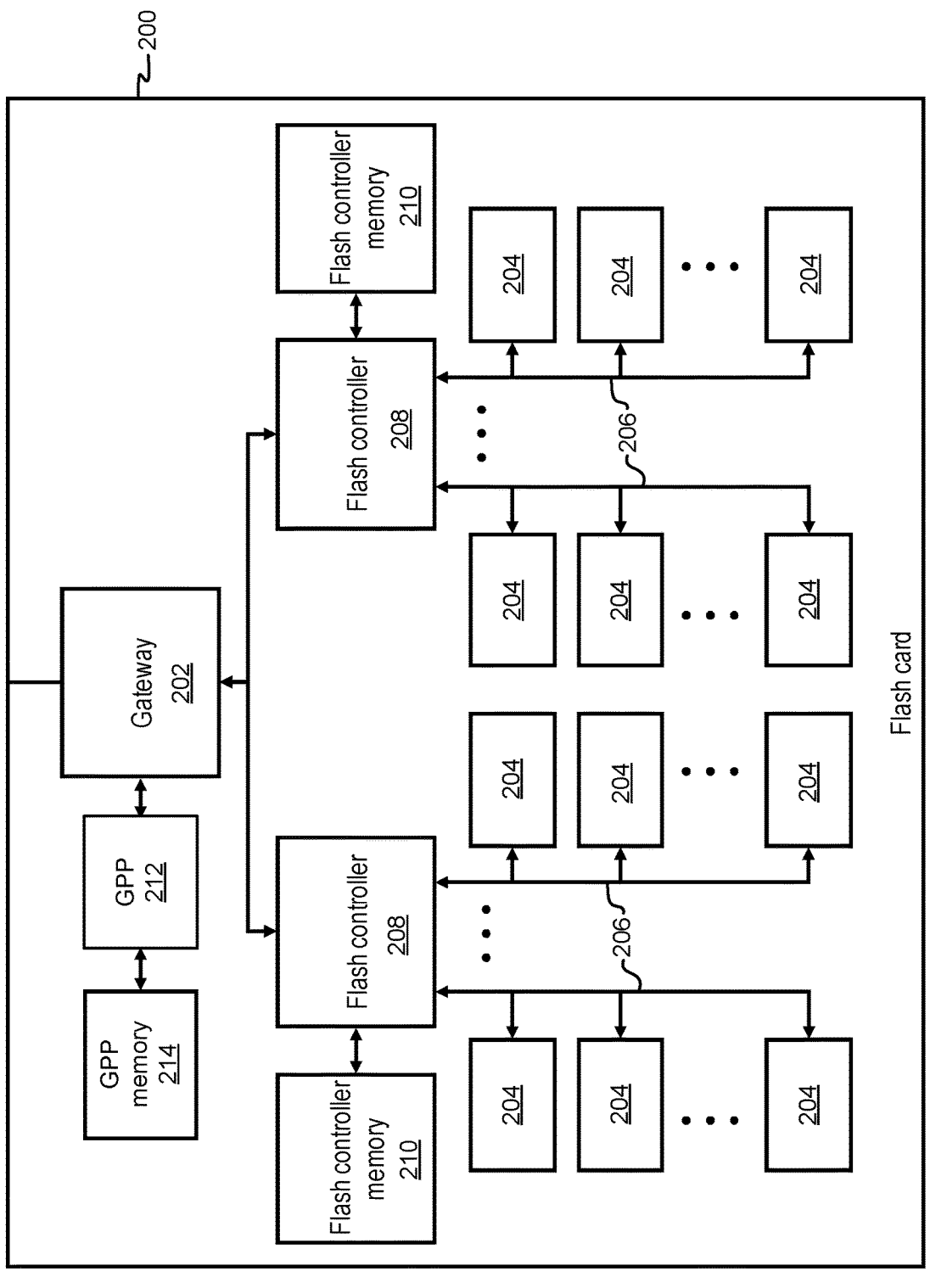
FIG. 2 is a diagram of a data storage system architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products which enable the ability to perform select I/O requests in memory despite the memory being placed in a protected state. As noted above, logical storage capacity may be disconnected from the corresponding amount of physical storage that is currently available in memory. This disconnect leads to situations where physical memory is fully depleted and placed in a protected state (e.g., write protect). While the protected state avoids data overflow, it locks the memory in an unusable form, which has caused conventional products to experience a significant amount of downtime. In sharp contrast, approaches herein are able to satisfy select requests received from hosts, even while memory is in a protected state. This gives hosts the ability to issue commands that are able to reclaim at least some of the used physical memory even while the memory is in a protected state, thereby returning the memory to an operational state and overcoming the issues that have plagued conventional products. These improvements are particularly desirable in low memory capacity situations. According to an example, which is in no way intended to be limiting, in non-volatile random access memory (NVRAM) such as NAND Flash memory, NOR Flash memory, phase-change memory (PCM), magnetoresistive RAM (MRAM), resistive RAM (RRAM), etc., a host is able to issue requests that cause invalid pages to be reclaimed from blocks, even while the NVRAM is in a write protect state. This avoids situations where memory is locked in a protected state and becomes unavailable to satisfy incoming I/Os. Implementations herein are thereby able to avoid increased latency and system downtime, e.g., as will be described in further detail below.

In one general approach, a computer-implemented method includes: receiving an indication that memory has entered a protected state. An I/O request that is intended for a target location in the memory is also received. Moreover, the relative significance of the I/O request is evaluated, and in response to concluding the I/O request is sufficiently significant, the I/O request is performed at the target location. However, in response to concluding the I/O request is insufficiently significant, the I/O request is denied.

It follows that various approaches herein are able to provide hosts the ability to reclaim unused portions of memory, even while the memory is in a protected state. For example, some approaches herein allow a host to reclaim invalid pages in NVRAM-based SSDs even while the memory is in a write protect mode. In a system setting, this allows hosts the ability to reclaim unused memory even while the memory is in a heightened protection state, allowing for the system to return to nominal operation. Approaches herein are thereby able to avoid situations where memory is unavailable to satisfy incoming I/Os, leading to reduced latency and system downtime.

In some implementations, the memory is NVRAM. Moreover, the NVRAM may include NAND Flash in some approaches. Accordingly, the relative significance of the I/O request may be positively correlated with a predicted impact the I/O request will have on an amount of available space in the memory in some approaches.

As noted below, the "significance" of an I/O request represents the predicted impact performing that I/O request will have on the amount of available space that is located in memory. Thus, by evaluating the significance of the I/O requests that are received, approaches herein are able to identify I/O requests that should be performed even while memory is in a protected state. Again, this allows for approaches herein to avoid situations where memory is unavailable to satisfy incoming I/Os, leading to reduced latency and system downtime.

In other implementations, one or more machine learning models are used to evaluate the relative significance of the I/O request. For instance, the machine learning models may be trained to generate a classification value that represents the relative significance of the I/O request. Moreover, a determination may be made as to whether the classification value for an I/O request is in a predetermined range. In response to determining the classification value is outside the predetermined range, a conclusion may be drawn that the I/O request is sufficiently significant. However, in response to determining the classification value is not outside the predetermined range, a conclusion may be drawn that the I/O request is insufficiently significant.

The machine learning models are preferably configured to evaluate information associated with incoming I/O requests. In other words, the machine learning models may be able to evaluate incoming I/O requests and identify the requests that are associated with creating available space in memory. The machine learning models may also incorporate use data in real time, providing an updated understanding of the status of the memory. This allows the machine learning models to dynamically adjust what types of I/O requests are performed based on the current state of the memory. Again, this provides hosts the ability to reclaim unused portions of memory, even while the memory is in a protected state.

In another general approach, a computer program product includes a computer readable storage medium having program instructions embodied therewith. Moreover, the program instructions are readable by a processor, executable by the processor, or readable and executable by the processor, to cause the processor to: perform the foregoing method.

In another general approach, a system includes: memory, and a processor. The system also includes logic that is integrated with the processor, executable by the processor, or integrated with and executable by the processor. Moreover, the logic is configured to: perform the foregoing method.

In yet another general approach, a computer-implemented method includes: receiving an indication that memory in a system has entered a protected state in response to an error being experienced by the system. In response to receiving the indication, an I/O request is prepared. The I/O request that is prepared is intended for a target location in the memory to circumvent the protected state. Moreover, the I/O request is configured to cause the memory to create more available space. Furthermore, the I/O request is sent to the target location in the memory.

Again, approaches herein are thereby able to provide hosts the ability to reclaim unused portions of memory, even while the memory is in a protected state. In a system setting, this allows hosts the ability to reclaim unused memory even while the memory is in a heightened protection state, allowing for the system to return to nominal operation. Approaches herein are thereby able to avoid situations where memory is unavailable to satisfy incoming I/Os, leading to reduced latency and system downtime.

In some implementations, the foregoing method is performed by a host logical partition. Moreover, the host logical partition is correlated with a set of target locations in the memory that the host logical partition is permitted to perform I/O requests at while the memory is in the protected state. For instance, the I/O request is an addressing and control command in some approaches. Accordingly, preparing the I/O request intended for a target location in the memory to circumvent the protected state may include setting a predetermined flag in the addressing and control command.

By notifying host logical partitions of errors and situations where memory has been placed in a protected state, implementations herein are able to broaden the number of situations approaches herein may be implemented to improve performance. For example, addressing and control commands are already widely used and may be updated to implement aspects of the approaches herein. For instance, by setting a predetermined flag in the addressing and control command, the host is able to easily identify I/O requests that are configured to improve storage capacity in the memory.

In still another general approach, a computer program product includes a computer readable storage medium having program instructions embodied therewith. The program instructions are readable by a processor, executable by the processor, or readable and executable by the processor, to cause the processor to: perform the method above.

A particular application of the general approach above, can be using the method as described to free invalid pages of data in memory that has been placed in a write protect state. For example, a reserved portion of memory may be released in response to entering the write protect state, thereby providing a user (e.g., host) the ability to issue I/O commands that cause the invalid pages of memory to be reclaimed. The present method thereby overcomes situations where the memory is locked in a memory protect state until the memory itself is serviced, e.g., as has been conventionally experienced.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved memory reclamation code at block 150 for providing the ability to perform select I/O requests in memory despite the memory being placed in a protected state. This desirably avoids situations where memory is unavailable to satisfy incoming I/Os and allows hosts the ability to increase memory capacity. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In approaches herein, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some approaches, a system may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By "integrated with", what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

For instance, the computing environment 100 includes memory that is located at a number of data storage locations. For instance, public cloud 105 and/or private cloud 106 may include memory that is configured to store data and provide access to the stored data. Similarly, client computer 101 and/or EUD 103 may include memory, e.g., such as storage 124. The type of storage used to form the memory at each location may vary depending on the implementation. For example, data and other information (e.g., metadata) may be stored in hard disk drives (HDDs), magnetic tape, solid state drives (SSDs), etc. The type of storage components implemented in memory may further impact how the data is written to and/or read from the memory. For instance, while sequential memory (e.g., such as HDDs, magnetic tape, optical media, etc.) stores data in a particular order, random access memory (e.g., such as NAND Flash implemented in SSDs) stores data across the memory without a particular pattern. As alluded to above, storing data at random in this manner allows for random access memory to access data in about the same amount of time irrespective of the physical location the data is stored in the memory. This gives memory like NAND Flash improved data access times compared to sequential memory, e.g., as described in further detail below.

FIG. 2 illustrates a memory card 200 having random access memory included therein, in accordance with one approach. It should be noted that although memory card 200 is depicted as an exemplary non-volatile data storage card in the present approach, various other types of non-volatile data storage cards may be used in a data storage system according to alternate approaches. It follows that the architecture and/or components of memory card 200 are in no way intended to limit the invention, but rather have been presented as a non-limiting example.

Moreover, as an option, the present memory card 200 may be implemented in conjunction with features from any other approach listed herein, such as those described with reference to the other FIGS., e.g., such as FIG. 1. However, such memory card 200 and others presented herein may be used in various applications and/or in permutations which may or may not be specifically described in the illustrative approaches listed herein. Further, the memory card 200 presented herein may be used in any desired environment.

With continued reference to FIG. 2, memory card 200 includes a gateway 202, a general purpose processor (GPP) 212 (such as an ASIC, FPGA, CPU, etc.) connected to a GPP memory 214 (which may comprise RAM, ROM, battery-backed DRAM, phase-change memory PC-RAM, MRAM, STT-MRAM, etc., or a combination thereof), and a number of memory controllers 208, which include Flash controllers in the present example. Each memory controller 208 is connected to a plurality of NVRAM memory modules 204 (which may comprise NAND Flash or other non-volatile memory type(s) such as those listed above) via channels 206.

According to some approaches, one or more of the controllers 208 may be or include one or more processors, and/or any logic for controlling any subsystem of the memory card 200. For example, the controllers 208 typically control the functions of NVRAM memory modules 204 such as, data writing, data recirculation, data reading, etc. The controllers 208 may operate using logic known in the art, as well as any logic disclosed herein, and thus may be considered as a processor for any of the descriptions of non-volatile memory included in approaches herein.

Moreover, the controller 208 may be configured and/or programmable to perform or control some or all of the methodologies presented herein. Thus, the controller 208 may be considered to be configured to perform various operations by way of logic programmed into one or more chips, modules, and/or blocks; software, firmware, and/or other instructions being available to one or more processors; etc., and combinations thereof.

Referring still to FIG. 2, each memory controller 208 is also connected to a controller memory 210 which preferably includes a cache which replicates a non-volatile memory structure according to the approaches described herein. However, depending on the desired approach, the controller memory 210 may be battery-backed DRAM, phase-change memory PC-RAM, MRAM, STT-MRAM, etc., or a combination thereof.

Memory controllers 208, GPP 212, and/or other controllers described herein may be able to perform various functions on stored data, depending on the desired approach. Specifically, memory controllers or GPP 212 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, memory controllers (e.g., see 208 and/or GPP 212 of FIG. 2) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Moreover, write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figures 3, 4:
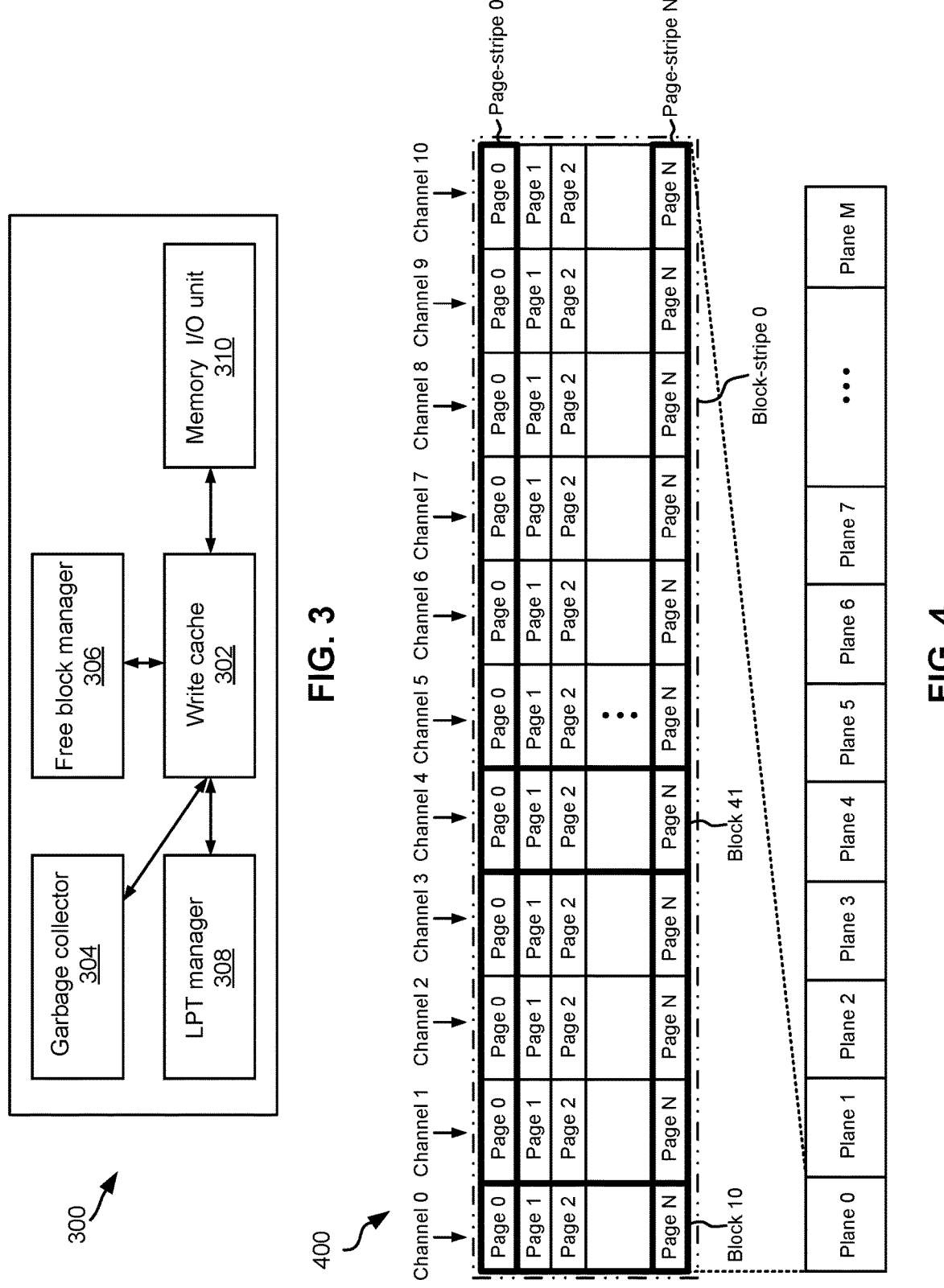
FIG. 3 is a system diagram, in accordance with one approach.
FIG. 4 is a conceptual diagram which includes a block-stripe and page-stripe, in accordance with one approach.

Referring now to FIG. 3, a system 300 is illustrated in accordance with one approach. As an option, the present system 300 may be implemented in conjunction with features from any other approach listed herein, such as those described with reference to the other FIGS. However, such system 300 and others presented herein may be used in various applications and/or in permutations which may or may not be specifically described in the illustrative approaches listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired approach. According to an exemplary approach, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one approach. LEBs are built from block stripes and typically a single block stripe is used to build a LEB. However, alternative approaches may use multiple block stripes to form an LEB. As an option, the present conceptual diagram 400 may be implemented in conjunction with features from any other approach listed herein, such as those described with reference to the other FIGS. However, such conceptual diagram 400 and others presented herein may be used in various applications and/or in permutations which may or may not be specifically described in the illustrative approaches listed herein. Further, the controller conceptual diagram 400 presented herein may be used in any desired environment. Thus, the exemplary non-volatile memory controller conceptual diagram 400 may be implemented in defining the organization of data stored in non-volatile memory.

Looking to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given approach of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

It should also be noted that in different implementations, the number of pages in each block and/or the number of channels in each plane may vary. According to an example, which is in no way intended to limit the invention, a block may include 256 pages, but could include more or fewer in different approaches. Similarly, the number of channels per plane and/or the number of planes may vary.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, situations arise in Flash-based SSDs (and other types of NVRAM) where logical storage capacity is disconnected from the corresponding amount of available physical storage. For instance, data can be compressed at different rates, making it difficult to estimate the amount of physical storage space that will be consumed by a given amount of data once it has been compressed. In situations where data compresses less than anticipated, a greater amount of physical storage space will be consumed than predicted, leading to situations where physical storage is fully consumed despite logical storage space still being available. Similar outcomes are experienced in conventional space efficient designs for which the logical storage capacity is inherently greater than the physical storage capacity. Such designs lead to situations where physical storage capacity is completely filled in response to data being less sparse than anticipated.

Conventional products have thereby suffered from significant performance delays and operational inefficiencies that result from locking memory during periods of depleted available space. Moreover, attempts to avoid locking the memory in such situations of low available space to retain performance results in data overflow situations, thereby leading to data loss, operational errors, system downtime, etc. It follows that a solution to this persistent degradation of memory management and access in conventional implementations is desired.

In sharp contrast to the conventional shortcomings mentioned above, approaches included herein are able to reclaim unused memory even while memory is in a protected state. For example, approaches herein allow a host to reclaim invalid pages in Flash-based SSDs even while the memory is in a write protect state. In a system setting, this allows hosts the ability to reclaim unused memory even while the memory is in a heightened protection state, allowing for the system to return to nominal operation. Implementations herein are thereby able to avoid situations where memory is unavailable to satisfy incoming I/Os, leading to reduced latency and system downtime, e.g., as will be described in further detail below.

Figure 5:
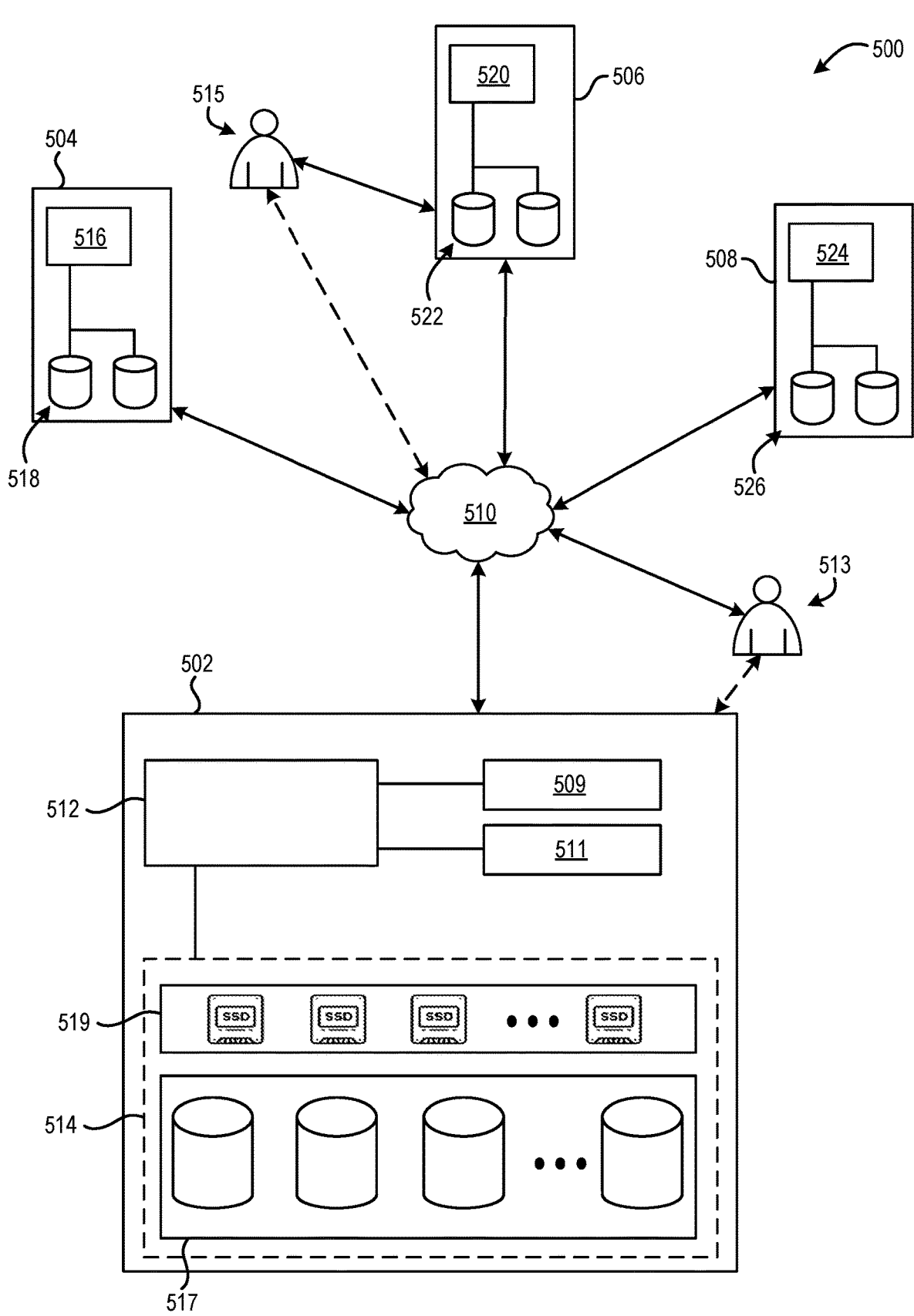
FIG. 5 is a representational view of a distributed system, in accordance with one approach.

Looking now to FIG. 5, a system 500 having a distributed architecture is illustrated in accordance with one approach. For instance, the system 500 may include a central data storage location used to store data for a number of host locations. As an option, the present system 500 may be implemented in conjunction with features from any other approach listed herein, such as those described with reference to the other FIGS., such as FIGS. 1-4. However, such system 500 and others presented herein may be used in various applications and/or in permutations which may or may not be specifically described in the illustrative approaches or implementations listed herein. Further, the system 500 presented herein may be used in any desired environment. Thus FIG. 5 (and the other FIGS.) may be deemed to include any possible permutation.

As shown, the system 500 includes a central data storage location 502 that is connected to a first host location 504, a second host location 506, and a third host location 508. Specifically, the central data storage location 502 and host locations 504, 506, 508 are connected to a network 510, and may thereby be positioned in different geographical locations. The network 510 may be of any type, e.g., depending on the desired approach. For instance, in some approaches the network 510 is a WAN, e.g., such as the Internet. However, an illustrative list of other network types which network 510 may implement includes, but is not limited to, a LAN, a PSTN, a SAN, an internal telephone network, etc. As a result, any desired information, data, commands, instructions, responses, requests, etc. may be sent between the host locations 504, 506, 508 and/or central data storage location 502, regardless of the amount of separation which exists therebetween, e.g., despite being positioned at different geographical locations.

However, it should also be noted that two or more of the host locations 504, 506, 508 and/or central data storage location 502 may be connected differently depending on the approach. According to an example, two edge compute nodes may be located relatively close to each other and connected by a wired connection, e.g., a cable, a fiber-optic link, a wire, etc., or any other type of connection which would be apparent to one skilled in the art after reading the present description. It follows that the particular approach illustrated in FIG. 5 is in no way intended to be limiting.

With continued reference to FIG. 5, the host locations 504, 506, 508 may have a different configuration than the central data storage location 502. For example, in some implementations the central data storage location 502 includes a large (e.g., robust) processor 512 coupled to a cache 509 and a tiered data storage module 514 having a relatively high storage capacity. For instance, the module 514 includes a first tier of memory 517 having an array of HDDs included therein, as well as a second tier of memory 519 having one or more SSDs included therein.

The central data storage location 502 is thereby able to process and store a relatively large amount of incoming data. The central data storage location 502 may receive data and/or data operation requests from a number of different locations, e.g., such as each of host locations 504, 506, 508. This allows for different host locations (also referred to herein as "hosts") to be connected to, and manage, data stored in memory at the central location. The components included in the central data storage location 502 thereby preferably have a higher storage capacity and throughput than components included in each of the host locations 504, 506, 508 to accommodate the higher flow of data experienced at the central data storage location 502.

It should be noted that with respect to the present description, "data" may include any desired type of information. For instance, in different implementations data can include raw sensor data, metadata, program commands, instructions, etc. It follows that the processor 512 may use the cache 509 and/or tiered data storage module 514 to actually cause one or more data operations to be performed. According to an example, the processor 512 at the central data storage location 502 may be used to perform one or more operations of method 600 of FIG. 6A.

An administrator 513 of the central data storage location 502 and/or processor 512 itself is shown as being connected to network 510 in FIG. 5. In some implementations, the administrator 513 may be directly connected to the central data storage location 502 as represented by the dashed arrowed line. It follows that the administrator 513 may be able to control at least a portion of the central data storage location 502. In some approaches, the administrator 513 may be able to control a clustered filesystem that is accessible from the central data storage location 502 and distributed across host locations 504, 506, 508, e.g., as would be appreciated by one skilled in the art after reading the present description.

A user 515 is also illustrated as being connected to one of the host locations 506. In some approaches, the user 515 connects to the host location 506 through a compute device (e.g., such as the user's personal computer, mobile phone, etc.) such that information can be exchanged therebetween. However, in other approaches the user 515 may be able to access the host location 506 using one or more terminals having a user interface. The user 515 may also be connected to the network 510 in some implementations. Accordingly, the user 515 may access host location 506 and/or other locations in system 500 through the network 510 in such implementations. In still other implementations, the user may be able to access network 510 through a direct connection to the host location 506.

The first host location 504 includes a processor 516 coupled to memory 518. Similarly, host location 506 includes a processor 520 coupled to memory 522, and host location 508 includes a processor 524 coupled to memory 526. The memory implemented at each of the host locations

504, 506, 508 may be used to store data received from one or more sensors (not shown) in communication with the respective host locations, a user 515 in communication with one or more of the host locations, other ones of the host locations, different systems also connected to network 510, etc.

It should also be noted that while the host locations 504, 506, 508 are depicted as including similar components and/or design, each of the host locations 504, 506, 508 may include any desired components which may be implemented in any desired configuration. In some instances, each host location in a system may be configured differently to provide each location with a different functionality. According to an example, which is in no way intended to limit the invention, host location 504 may include a cryptographic module (not shown) that allows the host location 504 to produce encrypted data, while host location 506 includes a data compression module (not shown) that allows the host location 506 to produce compressed data.

As noted above, while FIG. 5 includes three different host locations 504, 506, 508, components in the system 500 may change over time. Additional host locations may be added to the system 500 and/or host locations may be removed from the system 500 depending on the situation. For example, the amount of data processed by a central location may increase significantly over time and/or data compression rates may change over time, impacting the amount of available (e.g., free) space in memory. Accordingly, it may be desirable to allow for more free space to be created in memory as needed, even while the memory is in a protected state to avoid data overflow. In these protected states most I/Os are blocked in view of the unavailability of storage capacity, while certain hosts are able to proactively create available space in the memory to overcome the low memory capacity and exit the protected state. As used herein, "memory" may refer to any desired type of NVRAM, e.g., such as NAND Flash. However, other approaches may implement different types of memory.

The system 500 also preferably includes a machine learning module 511 that is configured to form, train, and apply machine learning models of desired types. The machine learning models are preferably configured to evaluate information associated with incoming I/O requests. For instance, in some approaches the machine learning models may be trained to evaluate the relative significance of a received I/O request. With respect to the present description, "significance" of an I/O request represents the predicted impact performing that I/O request will have on the amount of available space that is located in memory. In other words, the machine learning models may be able to evaluate incoming I/O requests and identify the requests that are associated with creating available space in memory. The machine learning models may also incorporate use data in real time, providing an updated understanding of the status of the memory. This allows the machine learning models to dynamically adjust what types of I/O requests are performed based on the current state of the memory.

In some approaches, machine learning models may be trained to evaluate the relative significances of incoming I/O requests and generate a classification value that represents the relative significance of the I/O request. Again, the "significance" of an I/O request is correlated with the amount of available space that will be created in memory as a result of performing the I/O request. Thus, the generated classification value may be compared against a range predetermined as representing the transition between insufficiently significant and sufficiently significant, to determine whether the I/O request should be performed.

It follows that in some approaches, the type of I/O request received determines if and/or how the I/O request is performed. This is particularly desirable in protected settings (e.g., write protect state), as the machine learning models are able to evaluate characteristics of incoming I/O requests, and selectively perform the I/O requests identified as having the potential to improve the state of the memory. In situations where memory has undesirably low storage capacity, I/O requests associated with reclaiming unused memory may be allowed to be performed. For example, I/O requests associated with reclaiming invalid blocks of Flash-based memory may be permitted.

Other approaches may evaluate additional details associated with I/O requests. For example, the source of an I/O request may be used to verify whether the request should be performed. The target location(s) for an I/O request may also be used to determine whether the request should be performed. In some approaches, certain sources (e.g., hosts) may be preestablished to communicate with specific target locations in memory, regardless of whether the memory is in a protected state or not. This gives users the ability to modify the memory to overcome issues that may be present. For example, a particular host may be preauthorized to reclaim invalid blocks of memory from specific locations therein. It follows that each host may be correlated with the same or different locations in memory, e.g., as will be described in further detail below.

Figure 6A:
FIG. 6A is a flowchart of a method, in accordance with one approach.

For instance, FIG. 6A includes a flowchart of a computer-implemented method 600 for providing hosts the ability to reclaim unused portions of memory, even while the memory is in a protected state. This desirably avoids situations where memory is unavailable to satisfy incoming I/Os and allows hosts the ability to increase memory capacity, e.g., as will be described in further detail below. The method 600 may be performed in accordance with the present invention in any of the environments depicted in FIGS. 1-5, among others, in various approaches. Of course, more or less operations than those specifically described in FIG. 6A may be included in method 600, as would be understood by one of skill in the art upon reading the present descriptions.

Each of the steps of the method 600 may be performed by any suitable component of the operating environment. For example, each of the nodes 601, 602, 603, 604 shown in the flowchart of method 600 may correspond to one or more processors, controllers, computer, etc., positioned at a different node of a distributed system (e.g., as seen in FIG. 5). For instance, node 604 may include one or more processors which are included at a first host location of a distributed system (e.g., see host location 504 of FIG. 5 above). Similarly, nodes 602 and 603 may each include one or more processors at second and third host locations of a distributed system (e.g., see host locations 506, 508 of FIG. 5 above). Furthermore, node 601 may include one or more processors which are located at a central server configured to manage a distributed system (e.g., see central data storage location 502 of FIG. 5 above). It follows that commands, data, requests, etc. may be sent between each of the nodes 601, 602, 603, 604 depending on the approach. Moreover, it should be noted that the various processes included in method 600 are in no way intended to be limiting, e.g., as would be appreciated by one skilled in the art after reading the present description. For instance, data sent from node 602 to node 603 may be prefaced by a request sent from node 603 to node 602 in some approaches.

In various implementations, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Looking specifically now to operation 606, an error is experienced at node 601 during operation of the system. In some situations, the error experienced in operation 606 may be experienced in memory that is located at node 601. For instance, the memory at node 601 may experience a low storage capacity situation in which the amount of available (e.g., free or useable) physical space in memory falls below a predetermined range. Low storage capacity situations are particularly undesirable because they significantly increase the risk of experiencing a data overflow or other memory based error resulting from a lack of memory to accommodate incoming I/O requests. Moreover, the "memory" may include any desired type of NVRAM (e.g., such as NAND Flash), but may include another type of memory depending on the desired approach.

In response to experiencing the error at operation 606, the memory at node 601 is preferably placed in a protected state. See operation 608. It should be noted that with respect to the present description, a "protected state" is intended to refer to a predetermined setting that the memory or system enters in certain situations, e.g., such as low physical storage capacity situations. While in that protected state, the memory in the system may be restricted from performing I/O requests. In other words, memory that has been placed in a protected state may not be able to perform data read, write, modify, etc. operations. For instance, a "write protect state" is a non-limiting example of a protected state that the memory may be placed in.

However, it should be noted that other types of errors may be experienced at node 601 (or the other nodes 602, 603, 604) that cause memory to be placed in a protected state. For example, determining that physical storage has been depleted may result in memory being placed in a write protect state to avoid overflow. However, the memory may be placed in a protected state for alternate reasons as desired, e.g., such as experiencing a predetermined number or write errors, experiencing a predetermined number of read errors, accumulating an undesired number of unsatisfied I/O requests in a buffer, etc. may cause node 601 and/or the memory located therein to be placed in a protected state.

While protected states help avoid data corruption following errors, it has caused performance issues in conventional products, particularly in situations having limited available memory. As noted above, memory without available (e.g., free) space may enter a protected state to avoid data overflow. While this desirably avoids data loss, the protected state can actually prevent the memory from creating more available space, effectively trapping the memory in a locked state.

It follows that implementations herein have developed an improved process of responding to low capacity situations in memory. For instance, implementations herein protect the memory from experiencing additional errors while in low storage capacity situations, while also permitting the memory to perform some I/O requests. For instance, by reserving a portion of physical memory that can be deployed while memory is in a protected state permits a host to actively create useable space in memory even while in the protected state. This allows the host to counteract low storage capacity in memory. Memory is thereby able to recover from these low storage capacity situations much more quickly than conventional products have been able to, and with far less interaction from administrators. Accordingly, implementations herein have developed a process of selectively performing specific received I/O requests that increase the amount of useable storage in memory, while ignoring (e.g., denying) any I/O requests that would further lower the amount of storage capacity.

In response to the memory at node 601 being placed in a protected state, optional operations 610*a*, 610*b*, 610*c* include requesting registers of memory locations that are permitted to perform I/O requests while the memory is in the protected state. In other words, optional operations 610*a*, 610*b*, 610*c* include initiating a process of establishing specific locations in memory that are permitted to perform certain types of I/O requests even in a protected state. In some approaches, a request may be sent to each host location that is connected to a central data storage location. Operations 610*a*, 610*b*, 610*c* are thereby shown as being sent to nodes 602, 603, 604, respectively.

In response, one or more of the nodes 602, 603, 604 may respond with registers of target locations in memory that are preauthorized to perform specific I/O requests even during periods that the memory is in a protected state. These registers may be used to create predetermined lists (e.g., lookup tables) that may be evaluated to quickly determine whether a received I/O request is directed to an authorized location in memory and/or is received from an authorized source (e.g., host). The registers (e.g., predetermined lists) may thereby be referenced while evaluating an incoming I/O request. In other approaches, these registers may have been established before the system is operational. Thus, received registers may be incorporated with predetermined lists generated while the system was being formed and/or based on past performance. However, it should be noted that the memory locations (e.g., tracks, volumes, etc.) that are specified in a register are preferably already allocated (e.g., reserved for a particular purpose) in approaches implementing thin provisioned space, or on a fully allocated standard volume, e.g., as would be appreciated by one skilled in the art after reading the present description.

Accordingly, nodes 602 and 604 are each shown as returning registers of target locations in memory that are preauthorized to perform I/O requests during a protected state. See operations 612*a*, 612*c*. It follows that the register received at node 601 in operation 612*a* may identify the specific target locations a host at node 602 is able to perform I/O requests at, while the register received in operation 612*c* identifies the specific target locations a host at node 604 is able to perform I/O requests at. It should also be noted that while a register is not received from node 603, some I/O requests may be initiated at node 601 by a host at node 603. For example, a significance of an I/O request received at node 601 may be evaluated to determine whether it is desirable to perform the request in the protected state.

It follows that I/O requests which are received at node 601 from other ones of the nodes 602, 603, 604 are preferably evaluated to determine whether they should be performed in the current protected state. Accordingly, an I/O request shown as being received at node 601 from node 603 in operation 614, is evaluated upon being received.

Accordingly, in response to receiving the I/O request from node 603, operation 616 further includes evaluating the received I/O request and determining whether the I/O request should be performed while the memory is in the protected state. As noted above, while memory at node 601 may be in a protected state (e.g., as a result of low storage capacity), it may be advantageous to perform some I/O requests while all other I/O requests may be ignored. For example, I/O requests that are configured to create additional useable space in memory by reclaiming invalid data blocks of NVRAM using garbage collection may be permitted, while new data write operations may be denied. These select I/O requests may be performed by utilizing a portion of physical memory reserved for situations where memory has been placed in a protected state. The size of the reserved portion of memory may be predetermined by a user, depend on the total physical storage capacity of the memory, be based on the type and/or number of I/O requests received by memory during nominal operation, etc.

The process of determining whether an I/O request should be performed in a protected state may evaluate a number of details. As noted above, in some approaches the source of the I/O request may indicate whether the I/O request should be performed while memory is in a protected state. For example, hosts at one or more nodes 602, 603, 604 may be preauthorized to perform I/O requests in memory even while the memory is in a protected state. Different hosts may be identified by unique identifiers (e.g., Internet protocol addresses) that can be used to distinguish between the I/O requests that should be performed.

In some approaches, the target location for an I/O request may be used to determine whether the I/O request should be performed. For example, one or more target locations in memory may be preauthorized to perform incoming I/O requests even while memory is in a protected state. One or more locations in memory (e.g., tracks, volumes, files, etc.) may be preauthorized to perform I/O requests even while memory is in a protected state. In some approaches, the one or more memory locations that are preauthorized may be associated with a particular host. For example, the tracks in memory that correspond to a host's user data may be preauthorized to be modified by the host during protected states. It follows that multiple hosts can be preauthorized (e.g., "registered") to the same set of tracks such that each host is able to perform different I/O requests on the set of tracks according to their desires.

It should also be noted that hosts and/or locations in memory may be preauthorized to initiate and perform I/O requests for certain periods of time. For example, a host may be preauthorized to issue I/O requests to protected memory for a predetermined amount of time following memory entering the protected state. In some approaches, each host may be assigned a different period of time to issue I/O requests to avoid overlapping (e.g., contradicting) I/O requests from being issued to memory from different hosts. In still other approaches, hosts and/or target locations in memory may be preauthorized to perform a certain number of I/O requests while in a protected state. Thus, an I/O request received from a preauthorized host and directed to a preauthorized target location may be denied in response to determining a certain number of I/O requests have already been performed. This may desirably avoid situations where host operations do not have an intended impact in the memory, thereby preventing the status of the memory from worsening.

In other approaches, the memory locations that are preauthorized may be associated with a memory reclamation process. For example, a buffer that accumulates memory blocks with a sufficient number of invalid pages may be preauthorized to perform I/O requests to create more available memory. In yet another example, a volume table of contents (VTOC) may be preauthorized to perform I/O requests that are received from specific hosts, thereby significantly improving the ability to move data, consolidate database entries, perform other work to manage and maintain critical records, etc.

With continued reference to FIG. 6A, it follows that the process of determining whether a given I/O request should be performed may be performed differently depending on the type of information that is available. In some approaches, the determination is made at operation 616 in response to using a register to determine whether the target locations specified in the I/O request received from node 603 are permitted to perform I/O requests while the memory is in the protected state. Similarly, a register may be used to determine whether the host at node 603 is permitted to initiate I/O requests in memory while the memory is in the protected state. In still other approaches, the I/O requests themselves may be evaluated to determine the predicted impact they will have on the memory. In other words, the content of the I/O requests may be examined to determine whether performing each of the I/O requests will improve the current status of the memory, or worsen it.

Figure 6B:
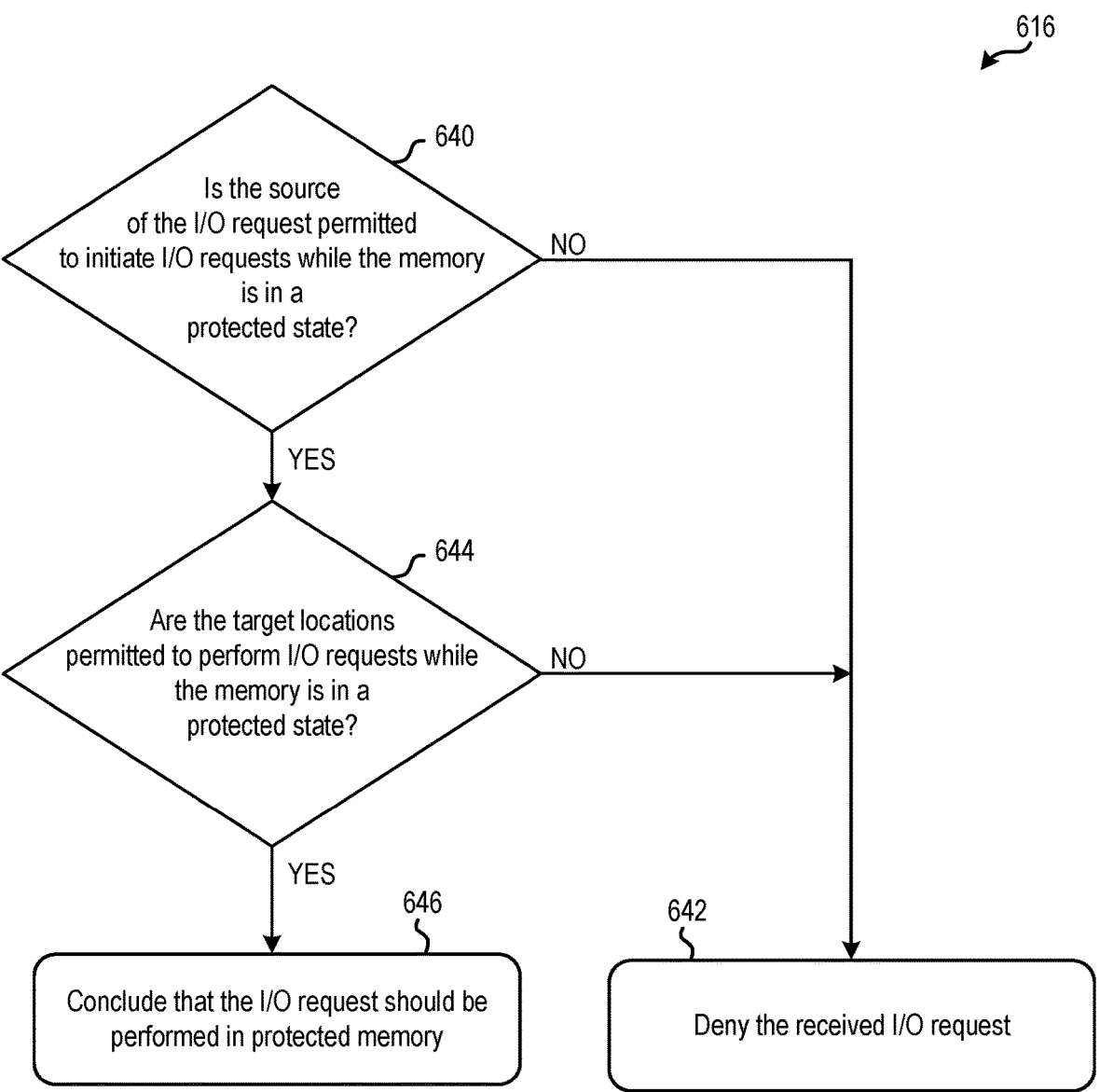
FIG. 6B is a flowchart of sub-operations that may be performed in association with one of the operations in the method of FIG. 6A, in accordance with one approach.
Figure 6C:
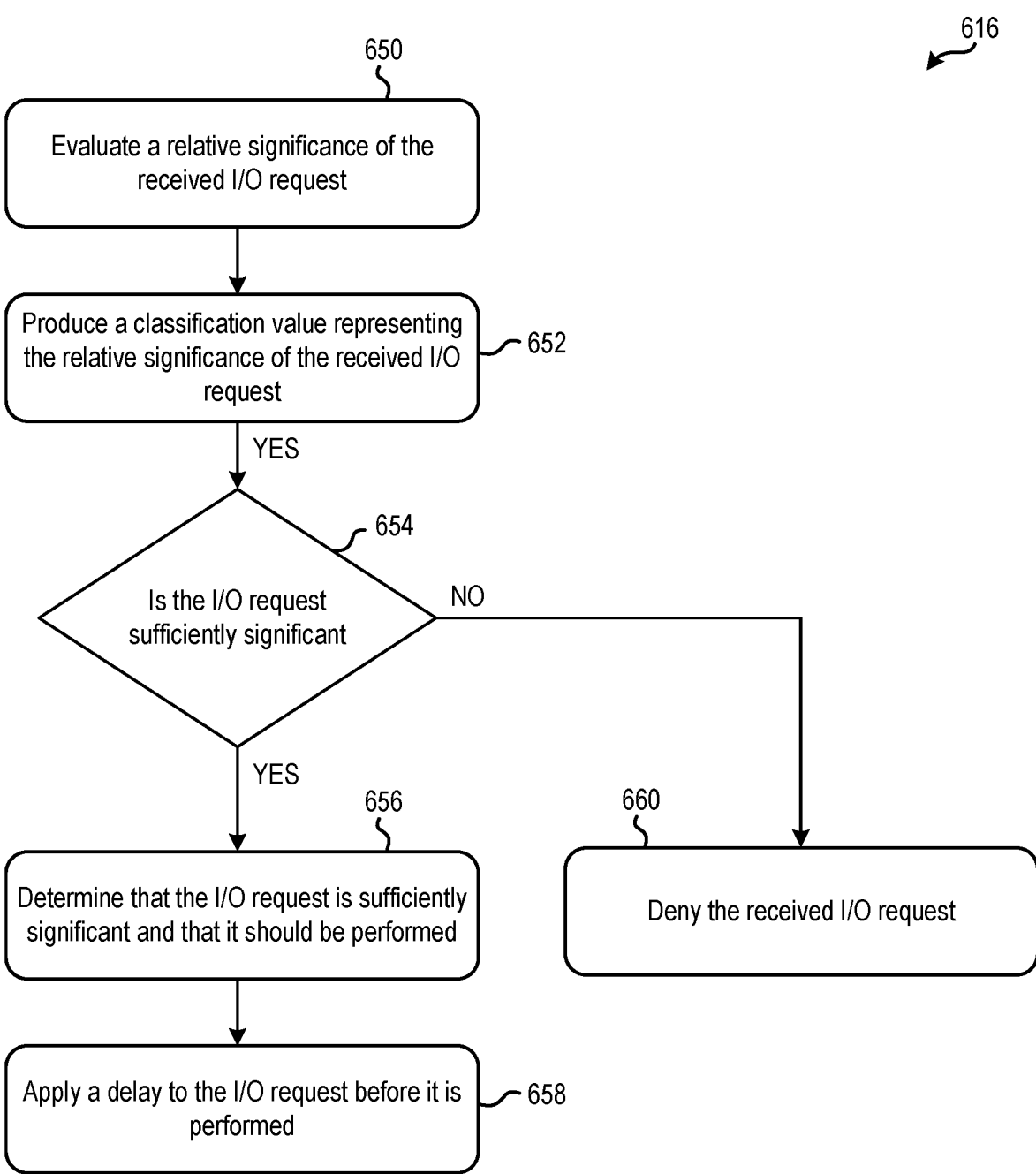
FIG. 6C is a flowchart of sub-operations that may be performed in association with one of the operations in the method of FIG. 6A, in accordance with one approach.

Referring momentarily now to FIGS. 6B-6C, exemplary sub-operations of determining whether a given I/O request should be performed in protected memory are illustrated in accordance with two approaches. However, it should be noted that sub-operations in FIGS. 6B and 6C may be combined in some approaches to determine whether some I/O requests should be performed. It follows that one or more of these sub-operations may be used to perform operation 616 of FIG. 6A. However, it should be noted that the sub-operations of FIGS. 6B-6C are illustrated in accordance with two approaches which are in no way intended to be limiting.

Looking first to FIG. 6B, sub-operation 640 includes determining whether a received I/O request has been received from a source that is permitted to initiate I/O requests while the memory is in the protected state. In other words, sub-operation 640 includes evaluating whether the host that issued the I/O request has been authorized to do so in protected memory states. As noted above, this may be accomplished by reviewing a lookup table used to organize each of the sources and the target locations in memory they are permitted to access, even during protected states.

In other implementations, hosts that issue I/O requests may be aware of when the memory is in a protected state. For instance, the hosts may receive a notification that memory has entered a protected state in response to an error experienced. While the memory is in a protected state, the hosts may prepare certain I/O requests such that they circumvent the protected memory state. In other words, the hosts may customize I/O requests to indicate they can be performed while memory is in a protected state, such that the customized I/O requests can be easily distinguished from other I/O requests that cannot be performed while the memory is protected. In some approaches, the hosts may set a flag on certain I/O requests to indicate they may be performed even while memory is in a protected state.

For example, the I/O request may be sent as an addressing and control command. In such approaches, a flag or bit may be set in an addressing and control command (e.g., such as define extent (DX), prefix (PFX), etc.) that is sent to memory to create more available space. This flag or bit may further be set by the respective host (e.g., source) sending the I/O request in response to identifying the memory is in a protected state. It should also be noted that each host may correspond to a respective host logical partition, where each host logical partition is correlated with a respective set of target locations in the memory that the host logical partition is permitted to perform I/O requests at while the memory is in the protected state. Accordingly, registries for the volumes and tracks ranges may be correlated with each of the host LPARs. While in a protected state, this allows for the system to determine whether an incoming write I/O originated from one of the registered LPARs and is directed to the volumes and/or track ranges identified as being able to participate in memory reclamation while in the protected state.

In response to determining the I/O request was received from a source that is not permitted to initiate I/O requests while the memory is in the protected state, the flowchart proceeds from sub-operation 640 to sub-operation 642. There, sub-operation 642 includes denying the received I/O request. In other words, the received I/O request is ignored and not performed (e.g., denied). In some approaches, the rejected I/O request may be returned to the source, stored in a queue, used to generate a warning message that is output, etc.

Returning to sub-operation 640, the flowchart proceeds to sub-operation 644 in response to determining the I/O request was received from a source that is permitted to initiate I/O requests while the memory is in the protected state. There, sub-operation 644 includes determining whether the corresponding target locations are permitted to perform the one or more of the I/O requests while the memory is in the protected state. As noted above, the target location for an I/O request may be used to determine whether the I/O request should be performed. For example, one or more target locations (e.g., tracks, volumes, files, etc.) in memory may be preauthorized to perform incoming I/O requests even while memory is in a protected state.

In response to determining that the target locations referenced in the I/O request are not permitted to perform the I/O request while the memory is in the protected state, the flowchart of FIG. 6B is shown as proceeding to sub-operation 642 from operation 644. However, in response to determining that the target locations referenced in the I/O request are permitted to perform the I/O request while the memory is in the protected state, the flowchart proceeds to sub-operation 646 from sub-operation 644. There, sub-operation 646 includes concluding that the I/O request should be performed in memory, irrespective of the protected state. It follows that the sub-operations of FIG. 6B are able to ensure that only I/O requests which improve the state of the memory are performed while the memory is in a protected state. This desirably avoids situations where the memory becomes stuck in a degraded state, requiring significant maintenance and/or replacement of the memory itself.

While the source and target location(s) of an I/O request may be used to evaluate whether the request should be performed in a given situation, additional factors may be used. For instance, looking now to FIG. 6C, the significance of an I/O request may be used to determine whether it should be performed while memory is in a protected state. There, sub-operation 650 includes evaluating a relative significance of the received I/O request. With respect to the present description, it should be noted that the "relative significance" of an I/O request is positively correlated with a predicted impact the I/O request will have on an amount of available space in the memory. In other words, the relative significance of an I/O request may be directly proportional to the amount of free space it will produce in the memory. However, the relative significance of an I/O request may change depending on the status of the memory. For example, in situations where the memory has an undesirably long queue of outstanding I/O requests, I/O requests that take a shorter amount of time to perform may be considered as being "more significant" by reducing the backlog of outstanding I/O requests more quickly.

In some approaches, one or more machine learning models may be used to evaluate the relative significance of the I/O requests that are received. It follows that sub-operation 650 may apply one or more machine learning models to evaluate the received I/O request. As noted above, machine learning models may be trained to evaluate information associated with incoming I/O requests. For instance, in some approaches the machine learning models may be trained to evaluate the relative significance of a received I/O request and determine if the request is associated with creating available space in memory. The machine learning models may also incorporate use data in real time, providing an updated understanding of the status of the memory. This allows the machine learning models to dynamically adjust what types of I/O requests are performed based on the current state of the memory.

In some approaches, machine learning models may be trained to evaluate the relative significances of incoming I/O requests and generate a classification value that represents the relative significance of the I/O request. Accordingly, sub-operation 652 includes producing a classification value representing the relative significance of the received I/O request. Again, the "significance" of an I/O request is correlated with the amount of available space that will be created in memory as a result of performing the I/O request.

Thus, the generated classification value may be compared against thresholds, ranges of values, etc., to develop an understanding of how significant the respective I/O request is in gaining useable space in memory. For instance, in some approaches, classification values may be compared to a threshold that represents the transition between sufficiently significant and insufficiently significant. Moreover, the threshold may be predetermined by a user, a memory administrator, a memory manufacturer, etc., based on the type of I/O request being evaluated. It follows that classification values may be compared against a threshold that shifts based on the type of I/O request being evaluated.

In other approaches, classification values are compared to a predetermined range representing the transition between what is considered insufficiently significant and sufficiently significant. This may provide some transition between I/O requests that are automatically implemented and those that are automatically denied. I/O requests with classification values that fall in the predetermined range may be examined in further detail to determine whether the I/O request should be performed. For example, past performance, machine learning model outputs, user preferences, etc., may be evaluated to determine whether an I/O request having a classification value that falls in the predetermined range should be performed in view of the protected memory. Moreover, a classification value for an I/O request that falls outside and above the predetermined range may be identified as sufficiently significant, while an I/O request classification value that is outside and below the predetermined range may be identified as being insufficiently significant. The relative significance of different I/O requests may thereby impact whether and/or how the respective requests are performed in protected memory.

In still other approaches, the classification value for an I/O request may be compared to a range that is predetermined as representing (e.g., corresponding to) an I/O request that is sufficiently significant. Thus, in situations where a range is predefined as representing a sufficiently significant I/O request, and the classification value for an I/O request being evaluated falls within that range, the evaluated I/O request is deemed sufficiently significant, and performed in memory despite being in a protected state. However, if the classification value for the evaluated I/O request was determined as falling outside the range, the I/O request is deemed insufficiently significant and therefore ignored while in memory protected states. Equivalently, in situations where a range is predefined as representing (e.g., corresponding to) I/O requests that are insufficiently significant, and the classification value for an I/O request being evaluated falls within that range, the evaluated I/O request is deemed insufficiently significant and ignored while in a protected memory state. However, if the classification value for the evaluated I/O request falls outside the range, the I/O request may be deemed insufficiently significant and ignored.

It should also be noted that the classification value may be represented in any desired format. The classification value may be a numerical value in some approaches, while in other approaches the value may correspond to a different hierarchy. For example, in some approaches the classification value may be set as being "high," "medium," or "low" to indicate the relative status of the memory. Thus, I/O requests determined as having a high or medium significance may be performed even while memory is in a protected state, while I/O requests determined as having a low significance are ignored while in the protected state.

Sub-operation 654 thereby includes determining whether the I/O request is sufficiently significant. As noted above, in some approaches sub-operation 654 includes comparing the classification value of the I/O request to a predetermined range. The range may have been predetermined by one or more hosts, manufacturers of the memory, system administrators, past performance, etc. Accordingly, the flowchart proceeds to sub-operation 656 in response to determining that the classification value of the I/O request is outside the predetermined range, it may be determined that the I/O request is sufficiently significant that it should be performed in memory despite it being in a protected state. In other words, the flowchart proceeds to sub-operation 656 in response to determining that performing the I/O request will actually improve the condition of the memory.

There, sub-operation 656 includes determining that the I/O request is sufficiently significant, and that it therefore should be performed in the memory. In some approaches, a delay is applied to the I/O request before it is performed. Thus, sub-operation 658 includes applying a delay to the I/O request before it is performed. In other words, although the I/O request has been identified as being sufficiently significant and approved to be performed in memory, a delay may be observed before the I/O request is actually satisfied. The size of the delay (e.g., the amount of time the I/O request is delayed) may vary depending on the status of the memory. For instance, the amount of delay that is applied to a sufficiently significant I/O request before it is performed may be inversely proportional to the amount of available space in memory. Thus, as the amount of available space in memory increases, the delay applied to the I/O request decreases to ensure I/O requests are performed more quickly to utilize the current storage capacity and maintain efficient performance. However, as the amount of available space in memory decreases, the delay applied to the I/O request increases, thereby slowing the rate that I/O requests are performed to allow for more useable memory (e.g., free pages) to be formed. It should also be noted that in other approaches, I/O requests determined as being sufficiently significant may be entered into a queue along with other sufficiently significant I/O requests, and performed in a last-in-last-out manner, a first-in-first-out manner, in a random order from the queue, etc.

However, in response to determining that the classification value of the I/O request is not outside the predetermined range, the flowchart advances from sub-operation 654 to sub-operation 660, where the I/O request is ignored. It follows that I/O requests determined as not having an improvement on the status of the memory are preferably not performed. This desirably avoids I/O requests that degrade the memory, while selectively implementing I/O requests that improve the status of the memory. Again, this allows for memory to more quickly overcome issues faced during operation, e.g., such as low capacity situations. It should also be noted that "outside the predetermined range" is in no way intended to be limiting. Rather than determining whether a value is outside the predetermined range, equivalent determinations may be made, e.g., as to whether a value is above a predetermined threshold, whether a value is inside a predetermined range, whether an absolute value is above a threshold, whether a value is below a threshold, etc., depending on the desired approach.

As noted above, the type of I/O request received thereby determines if and/or how the I/O request is performed. This is particularly desirable in protected settings (e.g., write protect state), as the machine learning models implemented in FIG. 6C are able to evaluate characteristics of incoming I/O requests, and selectively perform the I/O requests identified as having the potential to improve the state of the memory. In situations where memory has undesirably low storage capacity, I/O requests associated with reclaiming unused memory may be allowed to be performed. For example, I/O requests associated with reclaiming invalid blocks of Flash-based memory may be identified as significant, and permitted to be performed in memory.

Returning now to FIG. 6A, it follows that the process of evaluating a received I/O request and determining whether the I/O request should be performed while the memory is in the protected state may include a number of sub-operations depending on the approach. For instance, a source of the I/O request, target locations of the I/O request, a relative significance of the I/O request, etc., may be evaluated to determine whether the I/O request should be performed at the memory while in the protected state. Accordingly, operation 616 may determine and/or evaluate any desired information about a received I/O request to determine whether it should be performed.

In the present implementation, method 600 is shown as determining that the I/O request received from node 603 should not be performed. This may result from identifying that the I/O request did not originate from a preauthorized source, is not directed to a preauthorized target location in memory, is insufficiently significant in terms of creating useable space in memory, etc. Accordingly, the I/O request received from node 603 is denied at operation 618. However, additional I/O requests may be received at node 601. For instance, another I/O request is also shown as being received at node 601 from source node 604. See operation 620.

The I/O request received from node 604 is also examined. Accordingly, method 600 is shown as repeating operation 616 to evaluate various pieces of information that are associated with the received I/O request. It follows that any one or more of the implementations described above with respect to evaluating the I/O request received from node 603 may be performed as desired. Although the I/O request received from node 603 was ultimately denied as a result of the determination performed at operation 616, the I/O request received from node 604 may actually benefit the memory status. In other words, the I/O request received from node 604 may be identified as being received from a preauthorized source, be directed to preauthorized target locations in memory, be sufficiently significant in terms of improving memory performance, etc., and/or combinations thereof.

The process of determining whether an I/O request should be performed in protected memory may incorporate any of these details. For instance, depending on the type of protected state the memory has been placed in, operation 616 may evaluate and confirm that an I/O request is received from a preauthorized source, is directed to preauthorized target locations in memory that are associated with the preauthorized source, and is sufficiently significant in terms of improving memory performance, before the I/O request is allowed to be performed. It follows that different combinations of verification levels may be combined to achieve a desired level of protection for the memory, e.g., as would be appreciated by one skilled in the art after reading the present description.

With continued reference to FIG. 6A, method 600 is shown as advancing from operation 616 to operation 622 in response to determining that the I/O request received from node 604 should be performed in memory. There, operation 622 includes actually causing the I/O request received from node 604 to be implemented (e.g., performed) in the protected memory. Again, implementations herein are thereby able to ensure that I/O requests determined as being from preauthorized sources (e.g., hosts), I/O requests directed to preauthorized target locations in memory, and/or I/O requests determined as being sufficiently significant, may be performed in memory despite the memory being in a protected state.

It follows that the implementations herein are able to successfully implement I/O requests in memory even while the memory is in a protected state. This desirably allows certain entities (e.g., hosts) to modify memory in an attempt to remedy the issue that caused memory to enter the protected state. In low memory capacity situations, hosts are able to reclaim unused memory even while memory is in a protected state. For example, in NVRAM (e.g., NAND Flash), a host is able to issue I/O requests that result in invalid pages of memory being reclaimed from blocks (e.g., using garbage collection), even while the NVRAM is in a write protect state. This desirably avoids situations where memory is locked in a protected state and becomes unavailable to satisfy incoming I/Os. Implementations herein are thereby able to avoid reduced latency and system downtime which has plagued conventional products.

According to an in-use example, which is in no way intended to be limiting, hosts may be preauthorized to send certain types of I/O requests to protected memory for performance. These types of I/O requests that are preauthorized to be performed by memory in a protected state include, but are not limited to: ICKDSF INIT commands, DFSMSdss functions, SPACEREL commands (e.g., DSO 0x81 Release Allocated Space), DEFRAG commands (e.g., configured to reorganize data extents into contiguous extents), CONSOLIDATE commands (e.g., configured to consolidate extents), RELEASE/PARTREL commands (e.g., configured to release allocated but unused space), DUMP commands (e.g., configured to move data to tape or cloud storage), Delete commands for datasets on volumes, etc. GDPS also provides monitoring/automation tools that may be used to monitor incoming alerts and take actions appropriately.

It should also be noted that software for performing the methodology of FIGS. 6A-6C may be deployed to a computer that is used to perform the various operations of the method via any known technique(s). An exemplary process for such deployment is presented immediately below with respect to FIG. 7.

Figure 7:
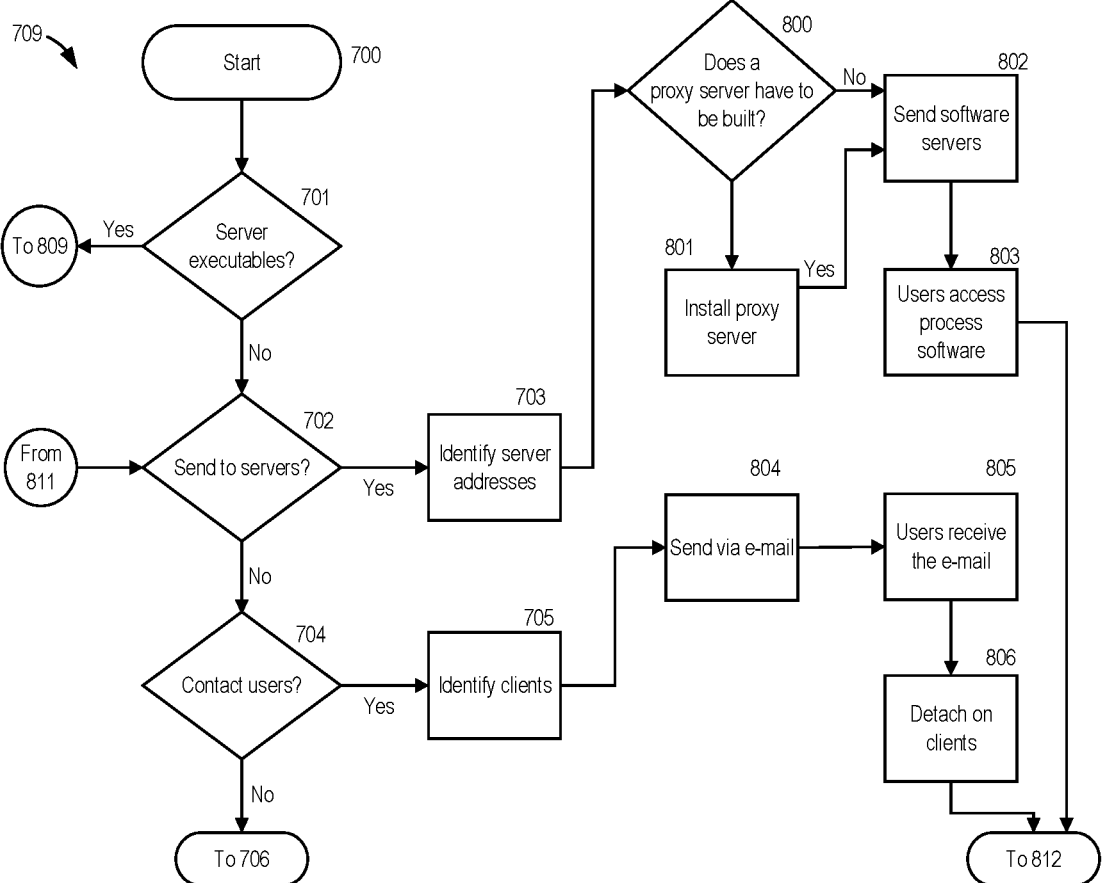
FIG. 7 is a flowchart of a method, in accordance with one approach.
Figure 7:
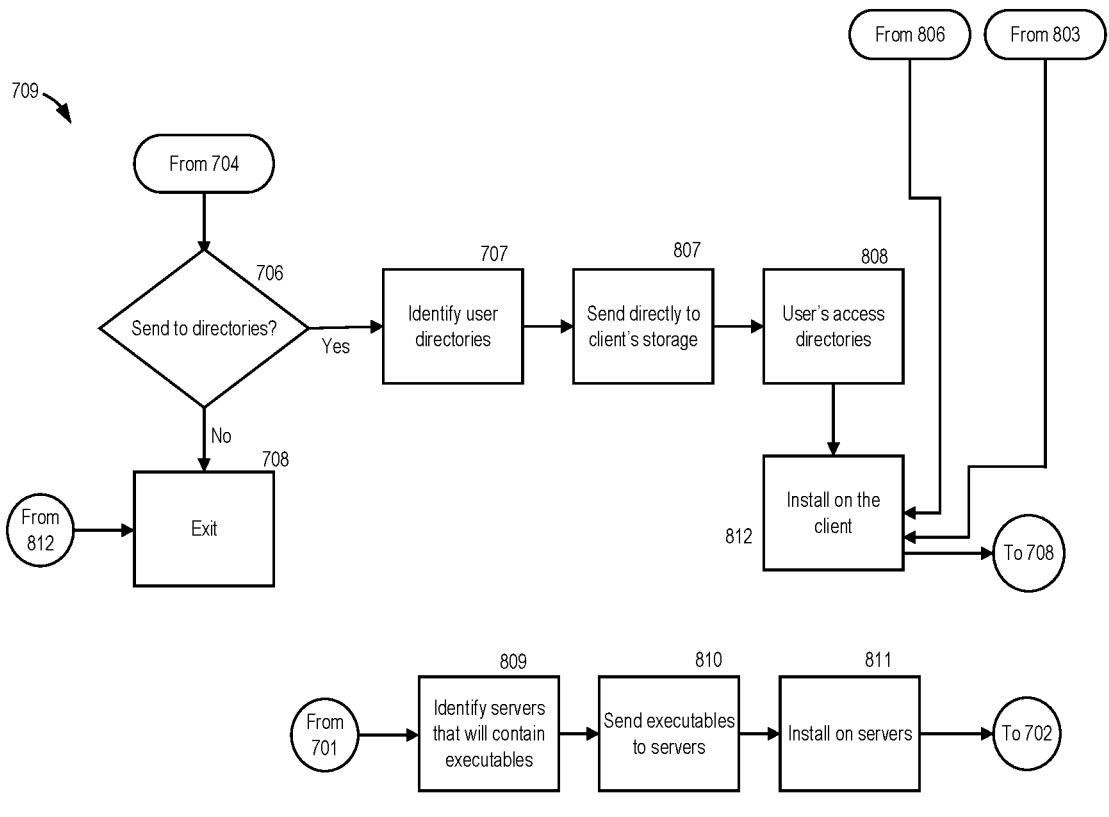

Now referring to FIG. 7, a flowchart of a method 709 is shown according to one approach. The method 709 may be performed in accordance with the present invention in any of the environments depicted in FIGS. 1-6C, among others, in various approaches. Of course, more or fewer operations than those specifically described in FIG. 7 may be included in method 709, as would be understood by one of skill in the art upon reading the present descriptions.

Each of the steps of the method 709 may be performed by any suitable component of the operating environment. For example, in some approaches, the method 709 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 709. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with for providing hosts the ability to reclaim unused portions of memory even while the memory is in a protected state, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 709, step 700 begins the deployment of the process software. An initial step is to determine if there are any programs that will reside on a server or servers when the process software is executed (701). If this is the case, then the servers that will contain the executables are identified (809). The process software for the server or servers is transferred directly to the servers' storage via FTP or some other protocol or by copying through the use of a shared file system (810). The process software is then installed on the servers (811).

Next, a determination is made on whether the process software is to be deployed by having users access the process software on a server or servers (702). If the users are to access the process software on servers, then the server addresses that will store the process software are identified (703).

A determination is made if a proxy server is to be built (800) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (801). The process software is sent to the (one or more) servers either via a protocol such as FTP, or it is copied directly from the source files to the server files via file sharing (802). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (803). Another approach is to have the servers automatically copy the process software to each client and then run the installation program for the process software at each client computer. The user executes the program that installs the process software on the client computer (812) and then exits the process (708).

In step 704 a determination is made whether the process software is to be deployed by sending the process software to users via e-mail. The set of users where the process software will be deployed are identified together with the addresses of the user client computers (705). The process software is sent via e-mail (804) to each of the users' client computers. The users then receive the e-mail (805) and then detach the process software from the e-mail to a directory on their client computers (806). The user executes the program that installs the process software on the client computer (812) and then exits the process (708).

Lastly, a determination is made on whether the process software will be sent directly to user directories on their client computers (706). If so, the user directories are identified (707). The process software is transferred directly to the user's client computer directory (807). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (808). The user executes the program that installs the process software on the client computer (812) and then exits the process (708).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method, comprising:
   receiving an indication that a memory has entered a protected state in response to an error being experienced by a system having the memory;
   receiving an input/output (I/O) request intended for a target location in the memory;
   causing a trained machine learning model to determine an amount of available space that will be created in the memory as a result of performing the I/O request;
   determining whether the target location is permitted to perform the I/O request while the memory is in the protected state by comparing the target location to memory blocks in a buffer, wherein the respective memory blocks include a number of invalid pages therein that is above a threshold; and
   in response to determining the target location matches one of the memory blocks in the buffer and concluding the amount of available space that will be created in the memory as a result of performing the I/O request is in a predetermined range;
      using a reserved portion of the memory to perform garbage collection on the target location, and
      in response to the garbage collection being performed, causing the I/O request to be performed at the target location.

2. The computer-implemented method of claim 1, further comprising:
   in response to determining the target location does not match any of the memory blocks in the buffer, denying the I/O request,
   wherein the reserved portion of the memory is different from the target location.

3. The computer-implemented method of claim 2, wherein the machine learning model is trained to generate a classification value that represents a significance of the I/O request.

4. The computer-implemented method of claim 3, further comprising:
   determining whether the classification value for the I/O request is in a predetermined range; and
   in response to determining the classification value is outside the predetermined range, concluding the I/O request is sufficiently significant.

5. The computer-implemented method of claim 4, further comprising:
   in response to determining the classification value is not outside the predetermined range, concluding the I/O request is insufficiently significant.

6. The computer-implemented method of claim 1, wherein the memory is non-volatile random-access memory (NVRAM).

7. The computer-implemented method of claim 6, wherein the memory is NAND Flash.

8. A computer program product, comprising a computer readable storage medium having program instructions embodied therewith, the program instructions readable by a processor, executable by the processor, or readable and executable by the processor, to cause the processor to:

receive an indication that a memory has entered a protected state in response to an error being experienced by a system having the memory;

receive an input/output (I/O) request intended for a target location in the memory;

cause a trained machine learning model to determine an amount of available space that will be created in the memory as a result of performing the I/O request;

determine whether the target location is permitted to perform the I/O request while the memory is in the protected state by comparing the target location to memory blocks in a buffer, wherein the respective memory blocks include a number of invalid pages therein that is above a threshold; and in response to determining the target location matches one of the memory blocks in the buffer and concluding the amount of available space that will be created in the memory as a result of performing the I/O request is in a predetermined range;

use a reserved portion of the memory to perform garbage collection on the target location, and in response to the garbage collection being performed, cause the I/O request to be performed at the target location.

9. The computer program product of claim 8, wherein the program instructions are readable and/or executable by the processor to cause the processor to:

in response to determining the target location does not match any of the memory blocks in the buffer, denying the I/O request, wherein the reserved portion of the memory is different from the target location.

10. PREVIOUSLY PRESENTED) The computer program product of claim 9, wherein the machine learning model is trained to generate a classification value that represents a significance of the I/O request.

11. The computer program product of claim 10, wherein the program instructions are readable and/or executable by the processor to cause the processor to:

determine whether the classification value for the I/O request is in a predetermined range; and in response to determining the classification value is outside the predetermined range, conclude the I/O request is sufficiently significant.

12. The computer program product of claim 11, wherein the program instructions are readable and/or executable by the processor to cause the processor to:

in response to determining the classification value is not outside the predetermined range, conclude the I/O request is insufficiently significant.

13. The computer program product of claim 8, wherein the memory is non-volatile random-access memory (NVRAM).

14. The computer program product of claim 13, wherein the memory is NAND Flash.

15. A system, comprising:

a memory;

a processor; and logic integrated with the processor, executable by the processor, or integrated with and executable by the processor, the logic being configured to:

receive an indication that the memory has entered a protected state in response to an error being experienced by a system having the memory;

receive an input/output (I/O) request intended for a target location in the memory;

cause a trained machine learning model to determine an amount of available space that will be created in the memory as a result of performing the I/O request;

determine whether the target location is permitted to perform the I/O request while the memory is in the protected state by comparing the target location to memory blocks in a buffer, wherein the respective memory blocks include a number of invalid pages therein that is above a threshold; and in response to determining the target location matches one of the memory blocks in the buffer and concluding the amount of available space that will be created in the memory as a result of performing the I/O request is in a predetermined range;

use a reserved portion of the memory to perform garbage collection on the target location, and in response to the garbage collection being performed, cause the I/O request to be performed at the target location.

16. The system of claim 15, wherein the logic is further configured to:

in response to determining the target location does not match any of the memory blocks in the buffer, denying the I/O request, wherein the reserved portion of the memory is different from the target location.

17. The system of claim 16, wherein the machine learning model is trained to generate a classification value that represents a significance of the I/O request.

18. The system of claim 17, wherein the logic is further configured to:

determine whether the classification value for the I/O request is in a predetermined range; and in response to determining the classification value is outside the predetermined range, conclude the I/O request is sufficiently significant; and in response to determining the classification value is not outside the predetermined range, conclude the I/O request is insufficiently significant.

19. A computer-implemented method, comprising:

in response to an error being experienced by a system, receiving an indication that memory in the system has entered a protected state;

sending, to a host location, a request for locations in the memory that are permitted to perform I/O requests while the memory is in the protected state;

receiving, from the host location, registers of target locations in the memory that are permitted to perform I/O requests while the memory is in the protected state;

determining whether the target locations are permitted to perform a given I/O request while the memory is in the protected state by comparing the respective target locations to memory blocks in a buffer, wherein the respective memory blocks include a number of invalid pages therein that is above a threshold; and in response to determining: one or more of the target locations match corresponding one or more of the memory blocks in the buffer, and concluding an amount of available space that will be created in the memory as a result of performing the given I/O request is in a predetermined range:

using a reserved portion of the memory to perform garbage collections on the one or more target locations.

20. The computer-implemented method of claim 19, wherein the host location includes a host logical partition, wherein the host logical partition is correlated with the target locations in the memory such that the host logical partition is permitted to perform I/O requests at the target locations while the memory is in the protected state.

21. The computer-implemented method of claim 19, further comprising:

receiving an I/O request, wherein the I/O request is an addressing and control command.

22. A computer program product, comprising a computer readable storage medium having program instructions embodied therewith, the program instructions readable by a processor, executable by the processor, or readable and executable by the processor, to cause the processor to:

in response to an error being experienced by a system, receive an indication that memory in the system has entered a protected state;

send, to a host location, a request for locations in the memory that are permitted to perform I/O requests while the memory is in the protected state;

receive, from the host location, registers of target locations in the memory that are permitted to perform I/O requests while the memory is in the protected state;

determine whether the target locations are permitted to perform a given I/O request while the memory is in the protected state by comparing the respective target locations to memory blocks in a buffer, wherein the respective memory blocks include a number of invalid pages therein that is above a threshold; and in response to determining: one or more of the target locations match corresponding one or more of the memory blocks in the buffer, and concluding an amount of available space that will be created in the memory as a result of performing the given I/O request is in a predetermined range:

use a reserved portion of the memory to perform garbage collections on the one or more target locations.

* * * * *